Oct. 20, 1953
C. E. OHLHEISER
2,655,734
APPARATUS FOR CONTROLLING HUMIDITY
CONDITIONS IN BULK MATERIALS
Filed Nov. 3, 1948
7 Sheets-Sheet 2
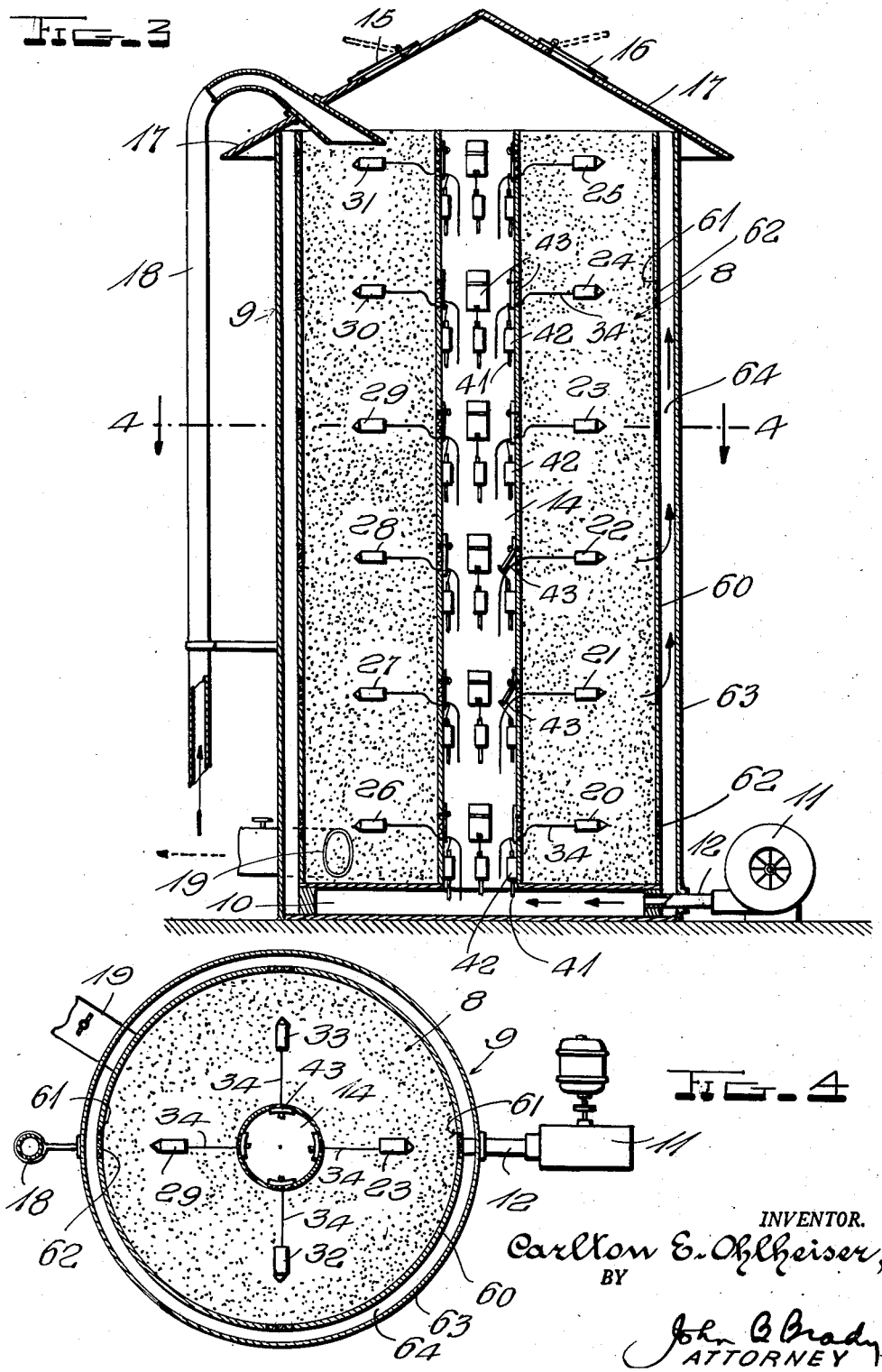
INVENTOR.
Carlton E. Ohlheiser,
BY
John B. Brady
ATTORNEY

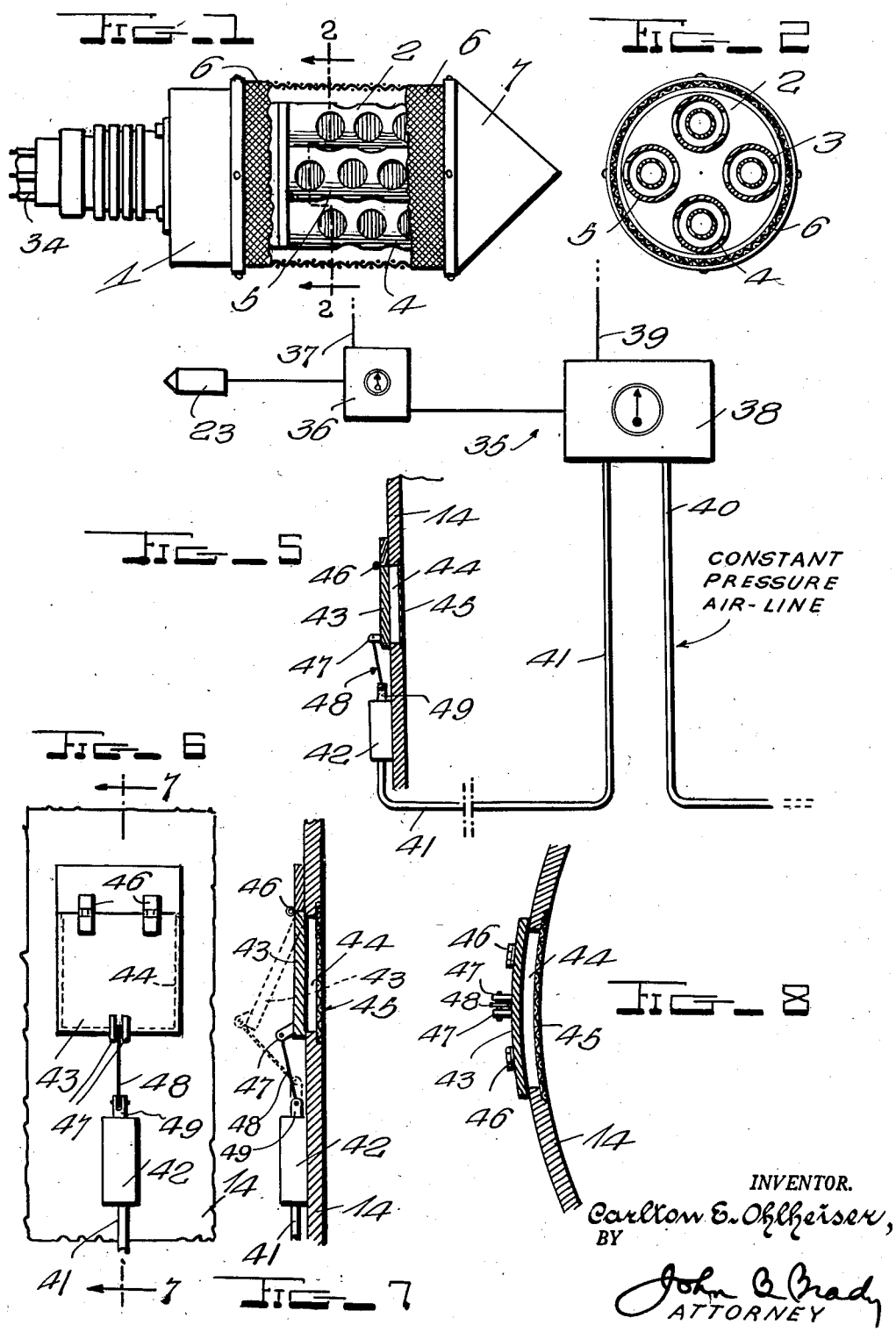

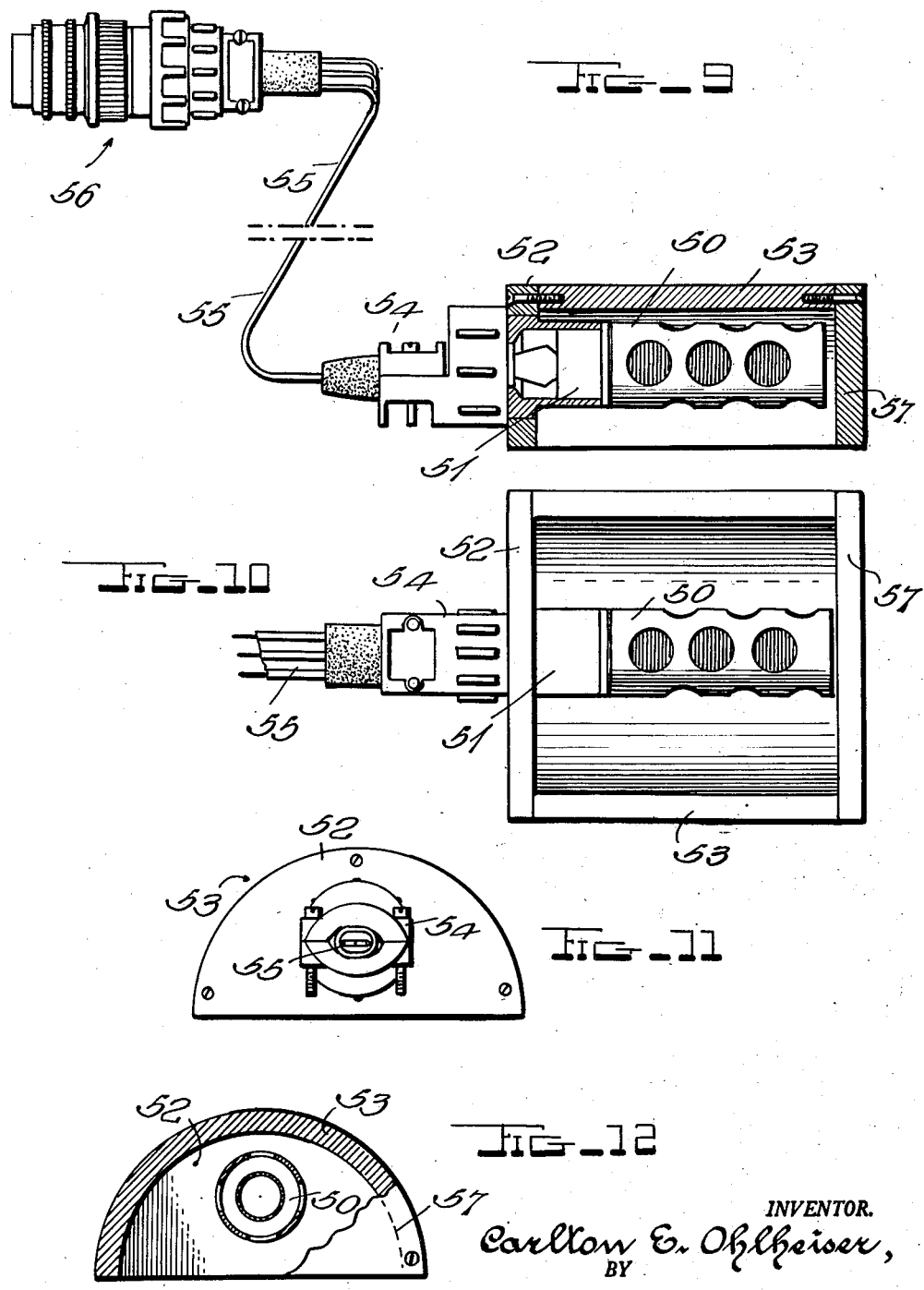

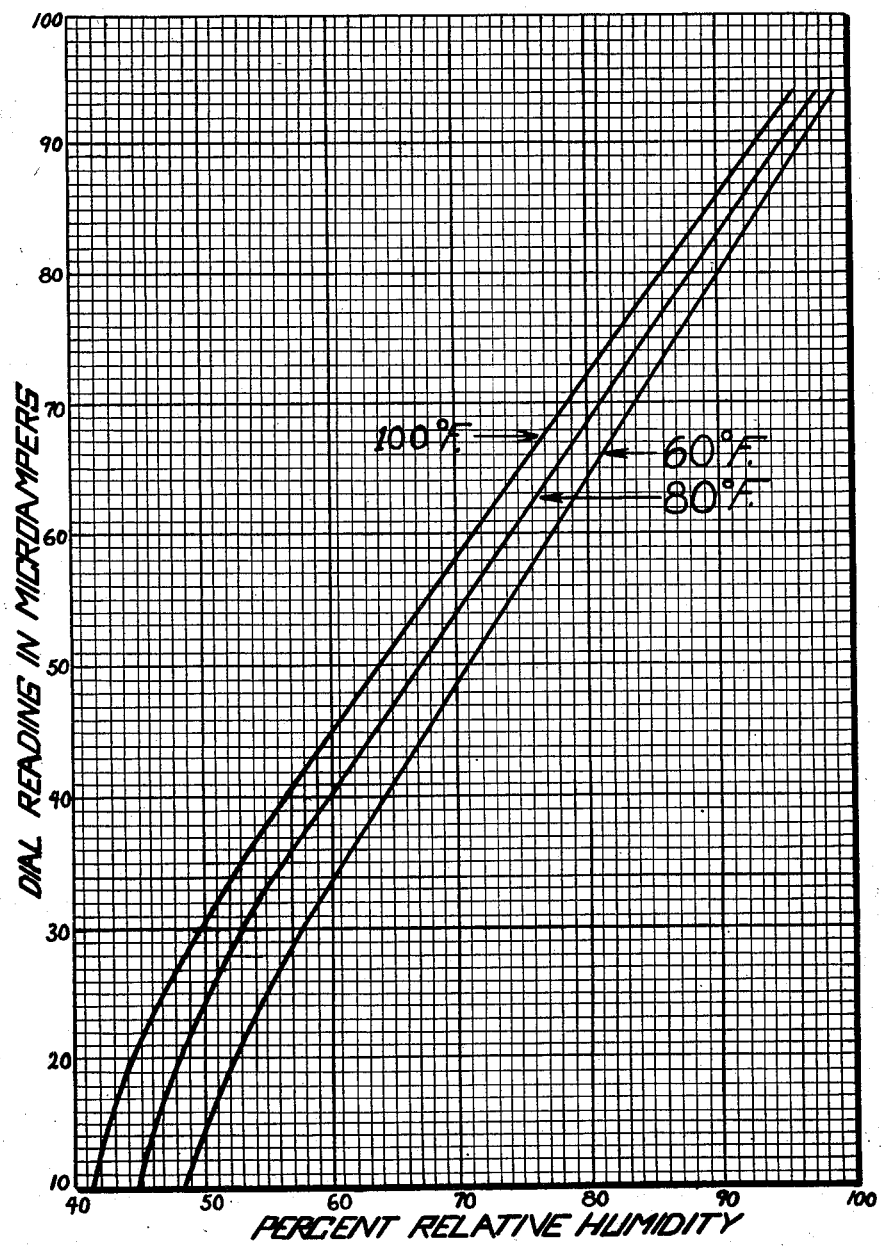

Oct. 20, 1953 — C. E. OHLHEISER — 2,655,734
APPARATUS FOR CONTROLLING HUMIDITY CONDITIONS IN BULK MATERIALS
Filed Nov. 3, 1948

INVENTOR.
Carlton E. Ohlheiser,
BY John B. Brady
ATTORNEY

Patented Oct. 20, 1953

2,655,734

UNITED STATES PATENT OFFICE 2,655,734

APPARATUS FOR CONTROLLING HUMIDITY CONDITIONS IN BULK MATERIALS

Carlton E. Ohlheiser, Silver Spring, Md., assignor to The American Instrument Company, Silver Spring, Md., a corporation of Maryland Application November 3, 1948, Serial No. 58,146

5 Claims. (Cl. 34—54)

My invention relates broadly to humidity control systems, and more particularly to a system for the precision control of humidity in bulk materials.

One of the objects of my invention is to provide a system responsive to conditions of humidity existent in bulk material such as grain, soap, granular bromides, malt, and other confined bulk and granular materials.

Another object of my invention is to provide control means for maintaining grain and other granular materials at proper conditions of humidity for preservation of the grain or granular material, and the prevention of spoilage thereof.

Another object of my invention is to provide a method of distributing humidity control devices throughout the area of granular bodies for detecting changes in humidity conditions and automatically controlling by such changes compensation means for maintenance of proper conditions of humidity necessary to the preservation of the granular material.

Still another object of my invention is to provide control means operative under conditions of changes in humidity in bulk material for operating forced draft equipment for blowing air through the bulk material for compensating for undesirable conditions of humidity and restoring the granular material to a proper humidity condition for the proper preservation thereof.

Other and further objects of my invention reside in a method and apparatus for maintaining granular material under conditions of substantially constant humidity, as set forth more fully in the specification hereinafter following, by reference to the accompanying drawings, in which:

Figure 1 is a side elevational view of one of the humidity sensing elements employed in the system of my invention, the view being partially broken away for indicating the individual sensing elements employed in the system of my invention; Fig. 2 is a transverse sectional view through the humidity sensing device taken substantially on line 2—2 of Fig. 1; Fig. 3 illustrates the application of the humidity sensing device of my invention to a grain storage silo wherein a multiplicity of the humidity sensing devices of Figs. 1 and 2 are distributed throughout the area of the grain storage silo and become buried in the grain therein and serve as detectors of humidity conditions in the bulk grain; Fig. 4 is a transverse sectional view taken substantially on line 4—4 of Fig. 3; Fig. 5 is a schematic view illustrating the manner in which the humidity sensing device controls the distribution of compensating air through the bulk grain in the grain storage silo of Figs. 3 and 4; Fig. 6 is an enlarged elevational view of one of the detectors for controlling the flow of humidity compensating air through the grain storage silo; Fig. 7 is a vertical sectional view taken substantially on line 7—7 of Fig. 6; Fig. 8 is a detail view showing the mechanization for controlling the position of the damper in the humidity compensating system employed in the grain storage silo of Figs. 3 and 4; Fig. 9 is a schematic view of a modified form of humidity sensing device embodying my invention; Fig. 10 is a plan view looking at the bottom of the humidity sensing device of Fig. 9; Fig. 11 is an end view of the humidity sensing device of Figs. 9 and 10; Fig. 12 is an opposite end view of the humidity sensing device of Figs. 9 and 11 partially broken away to show the humidity sensing device therein; Fig. 13 shows a typical series of curves illustrating changes in dial reading in microamperes at the recording apparatus for percent relative humidity at differing temperatures where readings were taken with the humidity sensing element buried in grain; Fig. 14 is a typical curve showing variation of humidity with moisture contained in grain, using the Brown-Duvel determination method; Fig. 15 is a typical curve showing variation of humidity with moisture contained in grain using the two stage determination method; Fig. 16 shows a curve comparing moisture determinations made by the Brown-Duvel and the two stage method in grain; Fig. 17 shows typical curves illustrating changes in humidity conditions in soap over predetermined time periods; and Fig. 18 shows a typical series of curves illustrating the evaporation rate from molding sand samples of various moisture concentrations as measured by the humidity measuring system of my invention.

Referring to the drawings in detail, reference character I designates a supporting head for a plurality of individual humidity sensing elements which I have designated at 2, 3, 4 and 5 supported by head I. Individual humidity sensing elements are protected by a foraminated casing 6 to which there is attached a conical shaped end 7. The foraminated casing 6 protects the humidity sensing elements 2, 3, 4, and 5 from direct contact with grain, molding sand, soap, bromide granular material or other granular material while enabling the sensing elements to be thrust into the granular material and buried therein. The humidity sensing elements may thus be located within the bulk granular material in positions which will detect true humidity conditions therein. In Figs. 3 and 4 I have shown the application of my invention to the protection of bulk grain 8 stored in the grain storage silo 9. The grain storage silo 9 includes a base support 10 beneath which a forced draft of air is induced from fan 11 to conduit 12 and directed upwardly through the central duct indicated at 14 discharged through the air vents designated at 15 and 16 in the roof 17 of the silo 9. The bulk grain 8 is delivered to the silo 9 in conventional manner through a suitable delivery conveyor tube 18 and is discharged in a similarly conventional manner through discharge opening 19. When the silo is not being filled the conveyor tube 18 is closed off by a suitable valve not shown. The bulk grain is divided into horizontal sectional areas throughout the entire vertical height of the silo and each of these areas is protected by a humidity sensing element which is buried in the grain as represented at 20, 21, 22, 23, 24 and 25 and at 26, 27, 28, 29, 30 and 31 in Fig. 3. In horizontal plan view the distribution of these humidity sensing elements is as set forth in Fig. 4 where two other columns of humidity sensing elements are buried in the grain at spaced intervals throughout the height of the grain storage silo as represented by humidity sensing elements 32 and 33.

The electrical conductors leading from the humidity sensing elements through the head 1 therein are brought out from each of the humidity sensing elements at the position 34 represented in Fig. 1, and shown schematically in Fig. 3. The conductors leading from the sensing elements are carried to a control panel from which the operation of the silo is regulated. Fig. 5 represents the equipment for each of the sensing control units on the control panel. The humidity sensing element 23 electrically connects with the hygrometer equipment represented generally at 35 including an indicator schematically shown at 36 which electrically responds to the humidity sensing element 23. The indicator 36 is supplied with power from the conventional 115 volt power line which I have indicated as a source 37, power from which is controlled by sensing element 23 to operate the pneumatic recorder controller shown schematically at 38. The pneumatic recorder controller is also supplied with 115 volt power through power line connection 39. A constant pressure air line 40 connects with the pneumatic recorder controller 38 and supplies the continuous pressure at approximately 17 p. s. i. This pressure is controlled through the control pressure air line represented at 41 which extends upwardly through the air duct 14 immediately adjacent the interior wall thereof leading to the air pressure damper motor schematically shown at 42. The air pressure damper motor 42 serves to control the movement of damper or valve 43 which normally closes the opening 44 in the side of the air duct 14 of the silo. Opening 44 is closed by an open mesh screen 45 which permits passage of air currents when damper 43 is open but which prevents the loss of grain through the wall of the silo when the damper 43 is open.

Opening 44 is representative of similar openings at different horizontal levels throughout the silo. In the outer wall 60 of the silo openings 61 are arranged at the same horizontal levels as openings 61 and covered by screens 62 to prevent loss of the grain. The outer wall 60 is surrounded by the spaced jacket 63 forming an annular stack 64 around the silo for the passage of air upwardly from the openings 61 to the air vents 15 and 16.

The damper or valve 43 is hinged at the top thereof through hinges 46 and normally gravitationally closes the opening 44. The lower edge of damper or valve 43 has a pair of lugs 47 thereon which are connected through link 48 with plunger 49 of the air pressure damper motor 42. Increase in air pressure in the controlled pressure air line 41 operates air pressure damper motor 42 to angularly shift damper 43 to the dotted line position 43' illustrated in Fig. 7 restricting the flow of air through the duct 14 and diverting the air into substantially horizontal paths through the bulk grain 8 thus directing the passage of air currents through the protected section of the silo which through the operation of the humidity sensing element 23 calls for air for compensating for an abnormal humidity condition.

The dampers 43 all open inwardly into the duct 14 from the top hinged connections thereof with the interior wall of the duct 14 so that the dampers serve as deflectors for the upwardly moving air and skim off and divert quantities of the air for distribution through the bulk grain 8. The arrangement of the openings 61 in the wall 60 of the silo substantially horizontally aligned with the dampers 43 insure the passage of the air in substantially horizontal paths through the bulk grain 8 and the discharge of the air upwardly within the annular stack 64 between the wall 60 and the pocket 63 surrounding the wall 60 in spaced relation thereto.

The several pressure air lines 41 extending from damper motors 42 are grouped around the side wall of the central air duct 14 and lead to the equipment shown in Fig. 5 at the central control board.

By dividing the silo into horizontally localized areas as illustrated in Figs. 3 and 4, dangerous conditions of humidity which may develop in the protected areas throughout the silo are promptly detected on the indicator 36 and the condition recorded on the pneumatic recorder controller 38 and immediately corrected by the supplying of compensating quantities of air by the opening of the individual damper or valve 43 controlled by the adjacent humidity sensing element.

Abnormal conditions of humidity which may occur in any area of the grain within the silo may produce a condition of spoilage which might spread throughout a large portion of the silo with a resulting loss of the grain. However, by proper distribution of the humidity sensing elements throughout the grain, compensating dry air may be supplied over a sufficient time period at each of the danger zones to eliminate the dangerous condition of humidity before the grain can be appreciably injured.

Various types of humidity sensing elements may be employed in the system of my invention. I have illustrated in Figs. 9–12 a modified form of humidity sensing element wherein the humidity sensing element is represented at 50 removably mounted in the socket 51 disposed in the end wall 52 of the housing 53. Connection is established with the terminals of socket 51 through the electrical connector fitting 54 connected through the moistureproof cable 55 with the fitting 56 which may establish connection with the complementary shaped coupling leading to the indicator 36 represented in Fig. 5, or the fitting 56 may connect directly with a complementary shaped fitting carried by the indicator equipment 36. The housing 53 is closed at its remote end 57 opposite the end 52 which supports socket 51 and constitutes a housing within which conditions of humidity in a confined space may be determined.

I have found this type of humidity sensing device particularly adaptable for determining humidity conditions in soap, granular bromides, and foundry sand. I have termed this particular form of humidity sensing device the Hygro-Cel. When it is desired to determine whether or not a material is in moisture equilibrium with surrounding conditions, the Hygro-Cel and its indicator are used in the following manner:

A humidity-sensing element is selected which will provide readings of the moisture in the surrounding air. This element is inserted in the Hygro-Cel housing which is then placed in contact with the surface of the material undergoing test, whether it be a piece of paper, foundry mold, soap, etc. When the Hygro-Cel is brought in contact with the material, the air space enclosed by the housing becomes isolated from the surrounding air because the open side of the housing is in contact with the material. The water vapor pressure within the Hygro-Cel and the water vapor pressure in the material under test will tend to come into equilibrium, which will cause a change in the relative humidity of the air within the Hygro-Cel. Moisture changes in this atmosphere as small as 0.15% relative humidity can be detected readily.

"Up scale" changes in indicator meter readings denote evaporation of moisture from the material; "down scale" changes indicate absorption of moisture by the material being tested.

Speed of response, accuracy, and broad range make the Hygro-Cel suitable, in many instances, for measuring moisture content by weight in solid materials.

The form of humidity sensing elements illustrated in Figs. 9–12 differs from the form of humidity sensing device illustrated in Figs. 1 and 2 by reason of the difference in number of the humidity sensing elements. A cluster of humidity sensing elements is shown in the arrangement illustrated in Figs. 1 and 2. By electrically connecting the four humidity sensing elements shown in Figs. 1 and 2 through various resistors the completed humidity sensing device when coupled to a resistance measuring electrical indicator of the type designated as 36 in Fig. 5, calibration curves, of the caliber illustrated in Fig. 13, are obtained. The time reading in microamperes obtained at the measuring instrument 36 of Fig. 5 has been plotted as ordinates as against percent of relative humidity plotted as abscissa. Three calibration curves were plotted for conditions existing at 60° F., 80° F., and 100° F. The calibration of the humidity sensing element may therefore be carried out with very great precision.

In order that a clearer understanding may be had of the variation of humidity with moisture content in whole kernel corn, I reproduce the following table showing readings I have taken to determine changes in relative humidity with moisture content in the whole kernel corn:

| Date | Sample number | Percent moisture | | | Equilibrium | |
| --- | --- | --- | --- | --- | --- | --- |
| | | Brown-Duvel | Two stage | | Percent R. H. | Temp.,[2] ° F. |
| | | | Trial 1 | Trial 2 | | |
| 4-6-48 | 1[1] | 7.0 | 9.3 | 9.4 | <40 | |
| 4-6-48 | 2[1] | 7.5 | 9.8 | 9.9 | <40 | |
| 4-6-48 | 3 | 11.6 | 12.8 | 12.9 | 59.0 | 80 |
| 4-9-48 | 4 | 11.8 | 12.6 | 12.5 | 63.5 | 79 |
| 4-9-48 | 5 | 12.9 | 14.1 | 14.0 | 71.5 | 80 |
| 4-6-48 | 6 | 13.2 | 14.7 | 14.6 | 71.0 | 80 |
| 4-8-48 | 7 | 14.0 | 15.1 | 15.2 | 76.5 | 80 |
| 4-7-48 | 8 | 14.2 | 14.6 | 14.6 | 75.5 | 80 |
| 4-8-48 | 9 | 14.6 | 15.1 | 15.3 | 79.0 | 79 |
| 4-9-48 | 10 | 14.8 | 15.7 | 15.9 | 79.0 | 81 |
| 4-7-48 | 11 | 15.7 | 15.8 | 15.7 | 82.0 | 78 |
| 4-8-48 | 12 | 17.3 | 17.0 | 17.3 | 85.5 | 80 |
| 4-7-48 | 13 | 17.4 | 17.0 | 16.9 | 85.0 | 80 |
| 4-9-48 | 14 | 17.8 | 18.1 | 18.2 | 87.5 | 81 |
| 4-9-48 | 15 | 18.0 | 18.6 | 18.4 | 86.5 | 83 |
| 4-7-48 | 16 | 18.8 | 18.3 | 18.1 | 88.0 | 78 |
| 4-8-48 | 17 | 18.9 | 19.2 | 19.5 | 90.0 | 79 |
| 4-9-48 | 18 | 20.0 | 20.1 | 20.5 | 90.5 | 82 |
| 4-7-48 | 19 | 20.7 | 19.8 | 19.9 | 88.5 | 83 |
| 4-8-48 | 20 | 22.4 | 19.5 | 19.5 | 89.5 | 83 |
| 4-7-48 | 21 | 22.5 | 19.7 | 19.9 | 91.0 | 81 |
| 4-8-48 | 22 | 26.8 | 22.4 | 22.8 | 92.0 | 83 |

[1] Untempered corn.
[2] Indicated by thermistor.

Figure 14:
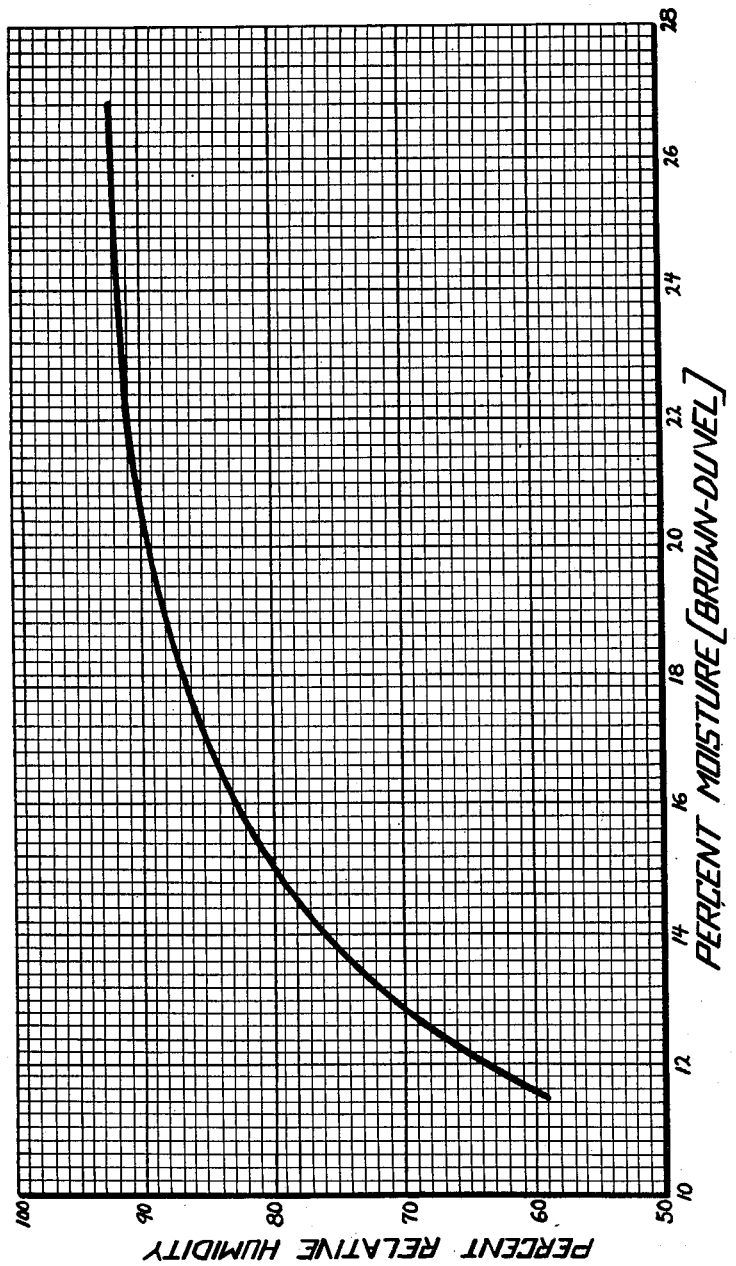
Fig. 14 shows variation of humidity with moisture content in grain, this determination having been made with whole kernel corn using the Brown-Duvel method.
Figure 15:
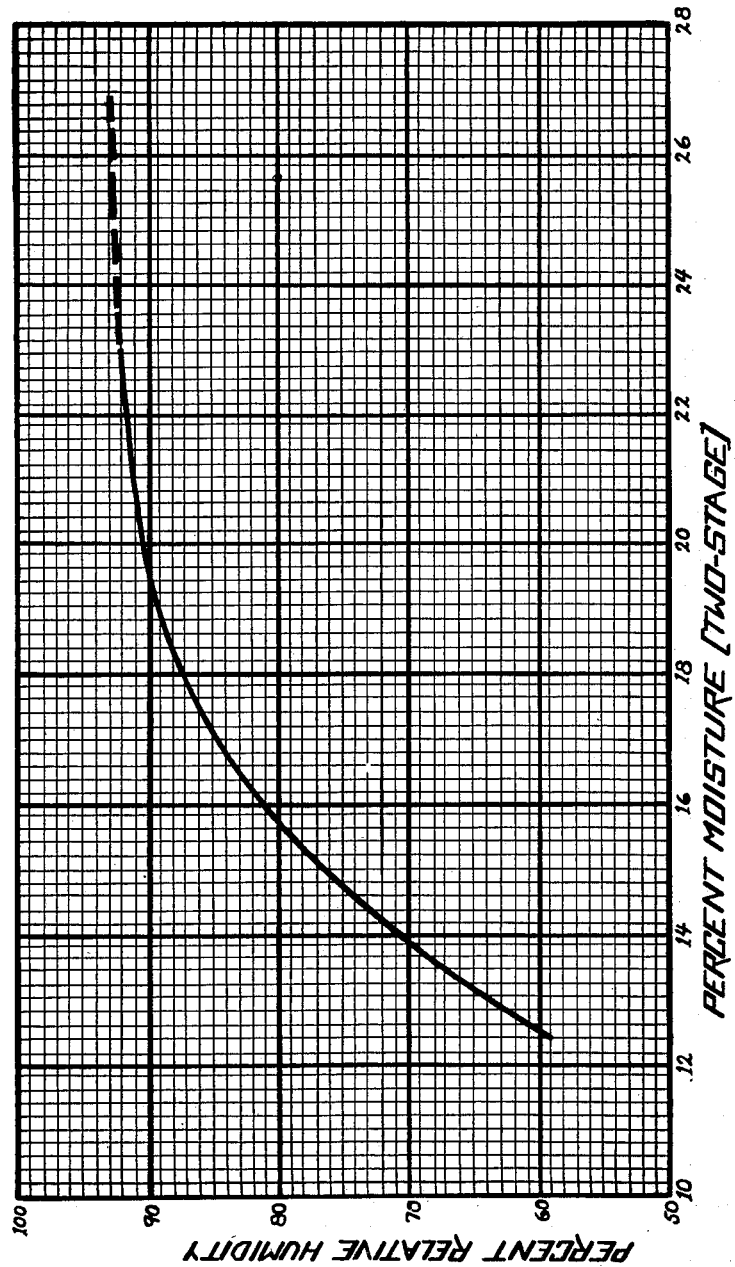
Fig. 15 illustrates the characteristic curve for variation of humidity with moisture content of whole kernel corn, using the two-stage method.
Figure 16:
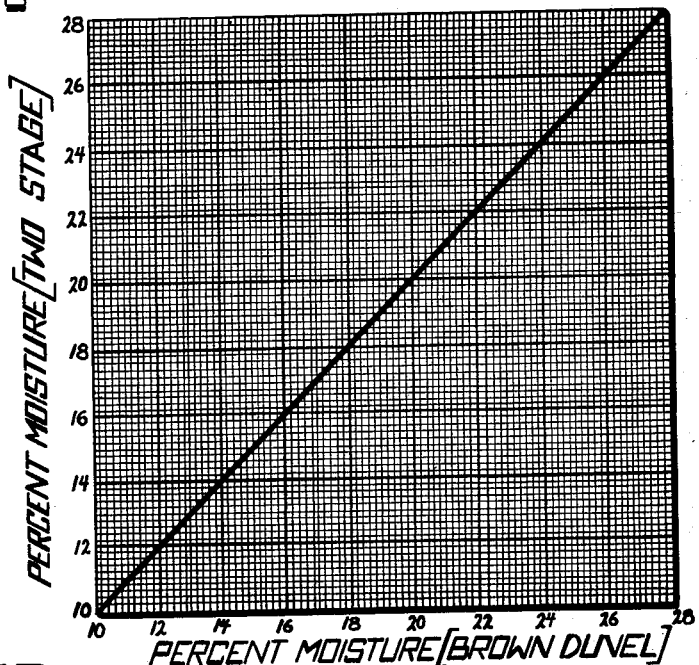
Fig. 16 is a curve showing the comparison of the two methods, that is, the Brown-Duvel and the two-stage methods, for determining variation of humidity with moisture content in whole kernel corn.
Figure 17:
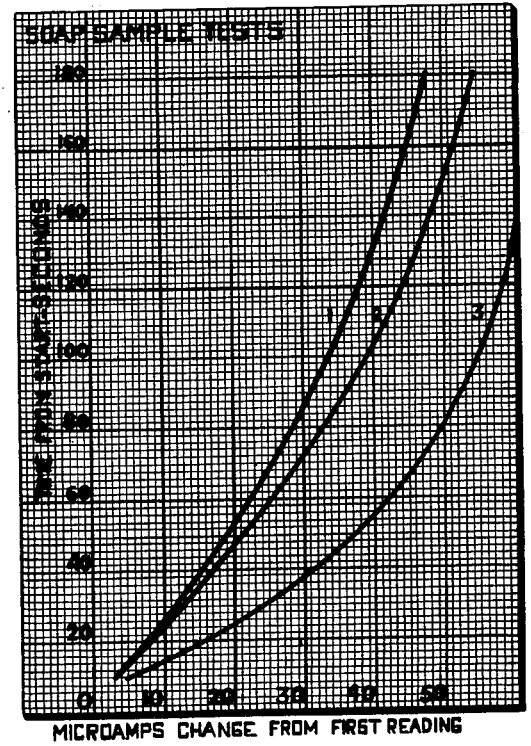

I have also made extended investigations of changes in moisture content in soap with variations in humidity and in Fig. 17 I have reproduced results of tests using three different soap samples. The ordinates in the curves of Fig. 17 indicate elapsed time from the start of readings of relative humidity for changes in microamperes from the initial reading. Comparative measurements can be made in one minute or less. The curves illustrate the water ($H_2O$) loss in soap samples using the oven method. For example, soap sample #1 lost 10.61 percent by weight; soap sample #2 lost 11.00 percent by weight; while soap sample #3 lost 14.44 percent by weight. This same data could have been plotted as a change in relative humidity as compared to time, or water content as compared to the rate of change of relative humidity after a constant time interval. The facts established by the tests with soap samples clearly verify the fact that a very definite relationship exists between variation of humidity with moisture content in soap which may be determined accurately using the method and apparatus of my invention.

Figure 18:
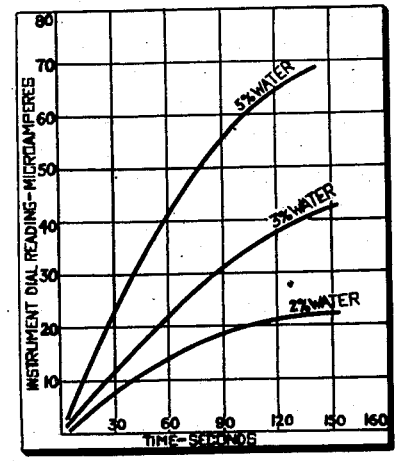

In Fig. 18 I have shown characteristic curves illustrating typical evaporation rate from molding sand samples of various moisture concentration as measured with indicating equipment 36 of my invention. With the humidity sensing device of Figs. 9–12 placed in contact with the sand mold surface, the evaporation of moisture is readily detectable. Since sand molds are porous, moisture evaporating from the surface is a relatively true indication of the moisture present throughout the entire depth of the mold. Therefore, the readings taken on the mold's surface provide a quick indication of the condition of the mold. The humidity sensing element has proven so sensitive that it is possible to detect moisture changes as small as 0.1 percent relative humidity. The humidity sensing element 50 in contact with the mold sand converts the electrical resistance of the sensing element into terms of relative humidity. Experience in determining moisture conditions in molding said has shown that if a rise in relative humidity above atmospheric conditions is indicated within thirty seconds after the instrument has been placed in contact with the mold, then the mold contains too much moisture for safe pouring. The sand mold is usually tested at several points on its surface, since all sections of the mold do not dry at the same rate.

Fig. 18 shows three typical curves representing the rate of moisture evaporation from samples of molds containing various moisture concentrations. The curve shows the rate in seconds at which the relative humidity rises inside the instrument housing. Curves of this type are not required in actual practice. A mold which is sufficiently dry for pouring will cause the relative humidity within the Hydro-Cel housing to rise only a few scale divisions after 30 seconds of contact with the mold. In contrast to this a mold which contains too much moisture will cause the relative humidity indication to rise possibly 30 scale divisions or more within 30 seconds after the instrument is placed on the mold to obtain a test reading.

I have found the method and apparatus of my invention highly practical in the protection of bulk materials and in the determination of the characteristics thereof, and while I have described my invention in certain of its preferred embodiments, I realize that modifications and changes may be made, and I desire that it be understood that no limitations upon my invention are intended other than may be imposed by the scope of the appended claims.

What I claim as new and desire to secure by Letters Patent of the United States is as follows:

1. A structure for storing grain and other granular materials at varying levels comprising a housing for storing bulk grain and other granular materials in a substantially vertical stack, a central air duct extending through said housing, a blower operating to force air through said central air duct, a multiplicity of humidity sensing elements inserted in the grain or other granular materials at different levels and responsive to changes in localized humidity conditions at the varying levels through said housing, means responsive to changes in humidity conditions arising in the humidity sensing elements for restricting the flow of air through said duct and diverting the air flowing through said central air duct into substantially horizontal paths through the grain or other granular material at different levels thereof for restoring conditions of humidity at the said levels to normalcy, and an annular stack surrounding said housing, said housing having screened ports therein interconnecting said housing with said annular stack at various levels for discharging air forced through the bulk material at the various levels under control of said humidity sensing elements through said annular stack.

2. Means for protecting granular material from deterioration and spoilage due to changes in humidity conditions comprising a vertically extending stack, a housing for receiving bulk material having an outer wall disposed in spaced relation to the inner wall of said stack and having confined openings in said outer wall connected with said stack at varying levels along the height thereof, a central duct extending vertically through said housing, a blower for forcing air through said duct, a multiplicity of humidity sensing elements distributed through the bulk material in said housing at different levels, electrical circuits controlled by each of said humidity sensing elements, and means controlled by each of said electrical circuits for diverting air from the forced flow of air through said air duct for directing the air in substantially horizontal paths under pressure through the granular material at different levels for restoring conditions of humidity at the different levels of the granular material to normalcy, the said forced flow of air being directed substantially transversely of the housing through the confined openings in the outer wall thereof and discharging into said stack.

3. A silo for storing grain comprising a vertically extending stack, a housing located within said stack with the exterior wall of said housing spaced from the interior wall of said stack, confining screened openings in the exterior wall of said housing directed into said stack, a central duct extending through said housing, said duct having screened passages therein substantially horizontally aligned with the screened openings in said housing, means for forcing air under pressure through said central duct, valves located along the interior wall of said central duct for opening or closing the screened passages therein, said housing providing a storage space for granular material at varying heights throughout the housing, and electrical humidity sensing elements submerged in the granular material at varying levels and developing electrical currents according to changes in humidity conditions in the granular material said valves being movable inwardly into said central stack adjacent each of the screened passages therein and controlled by the changes in electrical current developed by said humidity sensing elements for restricting the flow of air through said duct and diverting the air from said duct into the screened passages in said duct and through the granular material within said housing for discharge through the screened openings in said housing and into said stack for compensating for changes in humidity arising in the localized zones of the granular material stored in said housing.

4. Means for protecting granular material from deterioration and spoilage due to changes in humidity conditions comprising a vertically extending stack, a housing mounted within said stack and having screened openings discharging into said stack at varying levels along the height thereof, a central duct extending vertically through said housing, a blower for forcing air through said duct, a multiplicity of humidity sensing elements distributed through said housing at different levels and submerged in the granular material, screened passages arranged in the interior wall of said duct, valves normally closing said screened passages, compressed air operated means individual to each of said valves for opening and closing said valves in accordance with changes in electrical conditions in the humidity sensing elements substantially aligned with the level of said valves whereby a forced flow of air may be skimmed off from said central duct and distributed transversely of said housing through the granular material therein and directed through the screened openings in said housing and discharged through said stack for restoring humidity conditions in the localized areas of the granular material to normalcy.

5. Means for protecting granular material from deterioration and spoilage due to changes in humidity conditions comprising a vertically extending stack, a housing for storing granular material disposed within said stack and having confining openings in the outer wall thereof discharging into said stack at varying levels along the height thereof, a central duct extending vertically through said housing, a blower for forcing air through said duct, a multiplicity of humidity sensing elements distributed through said housing at different levels and submerged in the granular material, confining intake ports located at different levels in the interior wall of said central duct substantially in alignment with said confining openings in said housing, valve means normally closing said confining intake ports, compressed air operated devices for controlling said valve means, an indicator for indicating electrical changes in the condition of the said humidity sensing elements, a recorder operated simultaneously with the operation of said indicator, a compressed air control means operative simultaneously with the operation of said indicator and said recorder for automatically controlling the operation of said compressed air operated devices and controlling the position of the associated valve means for restricting the flow of air through said duct and diverting air from said duct through said confining intake ports and through the granular material in said housing and into said stack for compensating for changes in humidity conditions in said granular material.

CARLTON E. OHLHEISER.

References Cited in the file of this patent

UNITED STATES PATENTS

| Number | Name | Date |
|---|---|---|
| 691,209 | Tweedale et al. | Jan. 14, 1902 |
| 1,424,565 | Goskar | Aug. 1, 1922 |
| 1,647,863 | Galbraith | Nov. 1, 1927 |
| 1,929,084 | Strub | Oct. 3, 1933 |
| 2,027,268 | Davis | Jan. 7, 1936 |
| 2,205,814 | Forster | June 25, 1940 |
| 2,275,442 | Kennedy | Mar. 10, 1942 |
| 2,299,299 | Bills | Oct. 20, 1942 |
| 2,342,553 | Olpin | Feb. 22, 1944 |
| 2,444,588 | Bassinger et al. | July 6, 1948 |